July 14, 1931.  G. FLINTERMANN  1,814,140
SEAT ADJUSTING MEANS FOR VEHICLES
Filed May 8, 1929   2 Sheets-Sheet 1
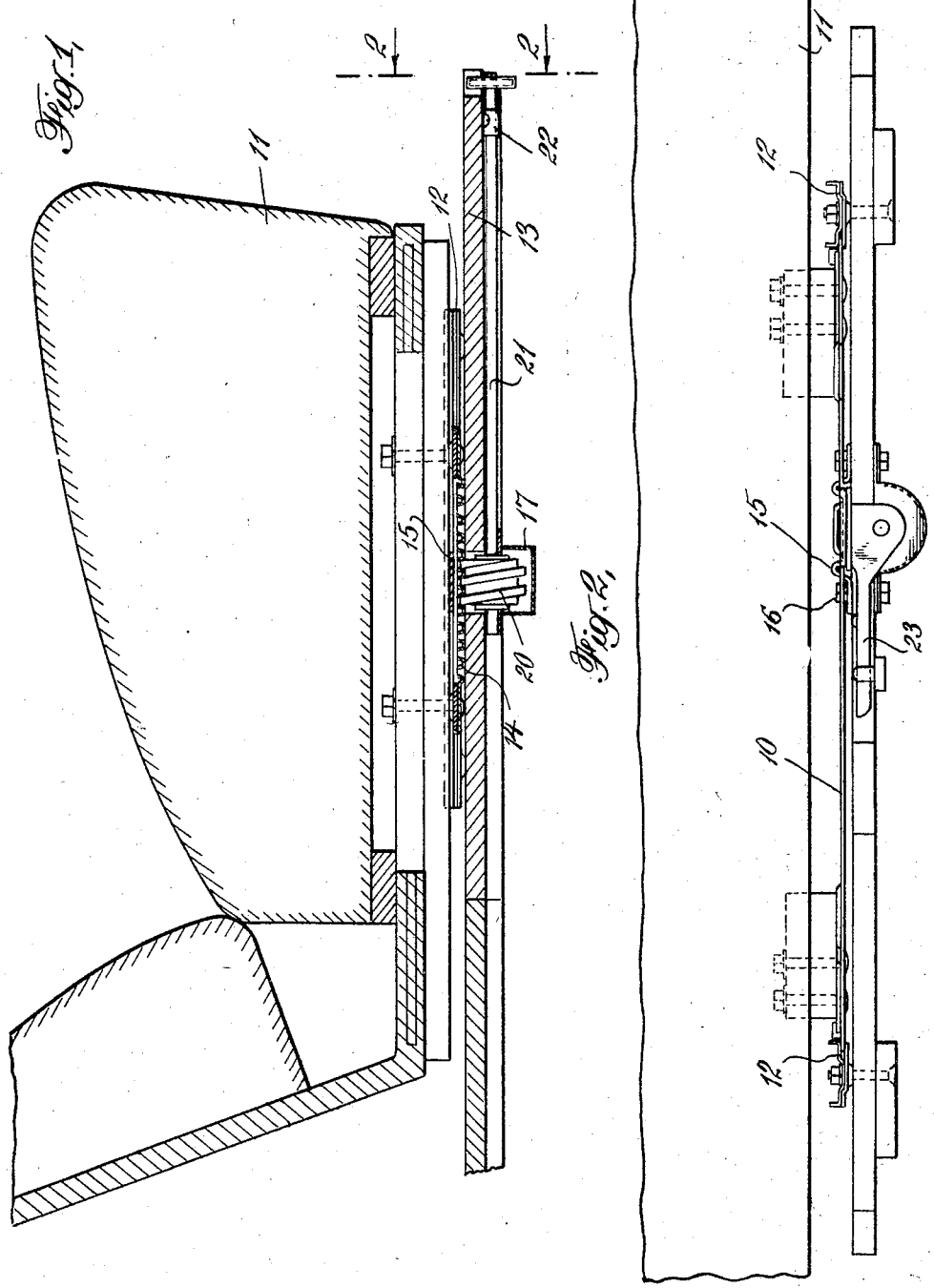
INVENTOR
Gerhard Flintermann
BY
Pennie, Davis, Marvin & Edmonds
HIS ATTORNEYS

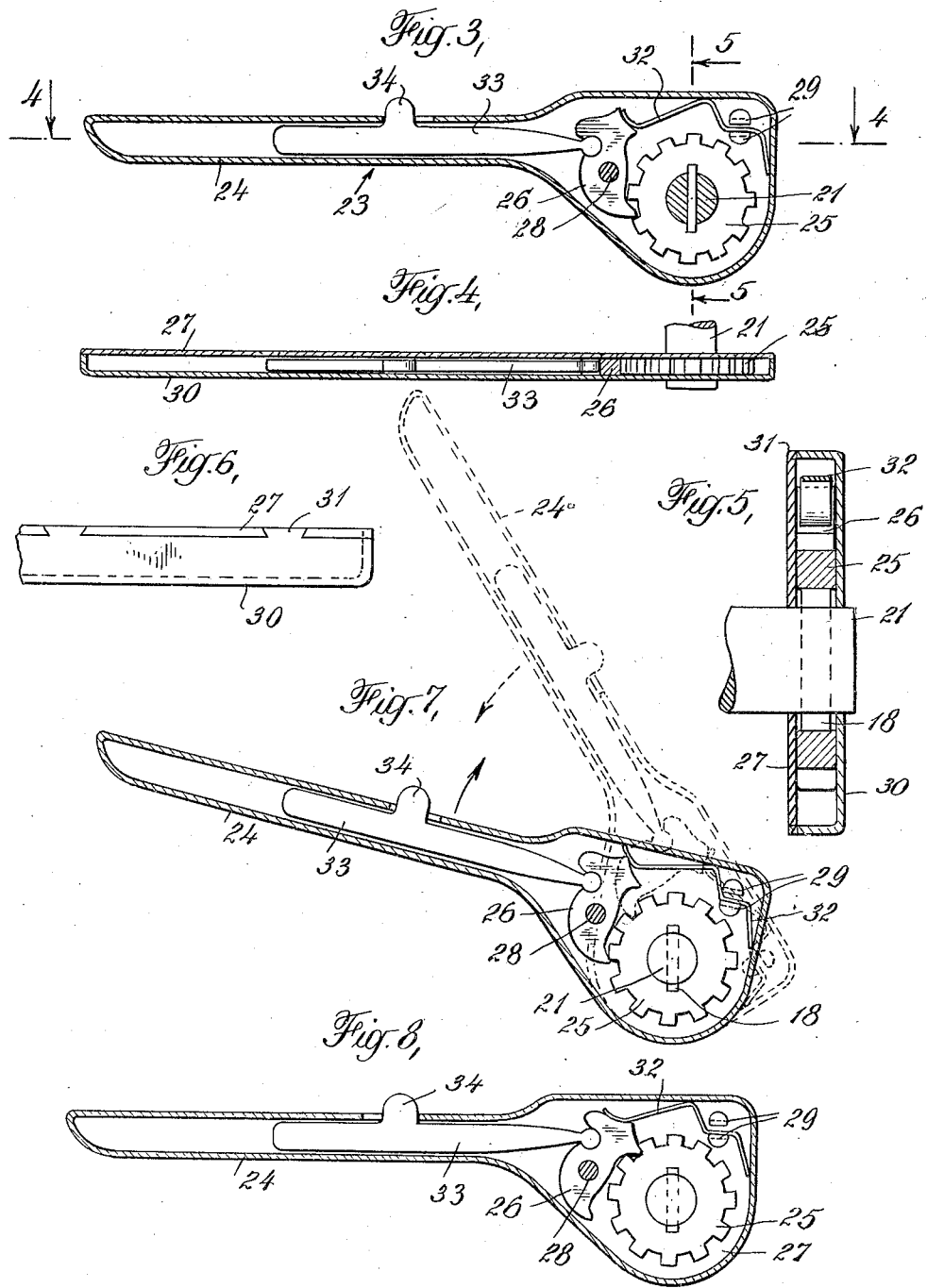

Patented July 14, 1931

1,814,140

UNITED STATES PATENT OFFICE

GERHARD FLINTERMANN, OF WEST ORANGE, NEW JERSEY

SEAT ADJUSTING MEANS FOR VEHICLES

Application filed May 8, 1929. Serial No. 361,403.

This invention relates to seats and has for an object the provision of an improved adjustable seat. More particularly, the invention contemplates the provision of improved adjusting means for seats. The invention further contemplates the provision of an improved reversible ratchet mechanism.

The invention is applicable to all structures comprising movable seats and in which a relatively simple adjusting mechanism and a convenient arrangement of the adjusting means are desirable. The invention is particularly applicable to automobile seating arrangements. In automobile construction, refinements, in order to be commercially practicable, must be simple, efficient and relatively cheap. Adjustable seat mountings should be such that little or no additional space is required and all parts are so disposed that they do not interfere with the operator, and so that adjustments may be made with a minimum of effort.

Apparatus constructed in accordance with the present invention is simple and efficient and requires a minimum of space for its installation and a minimum of effort for its operation.

In the application of the invention to automobiles, apparatus of the invention comprises an adjustably mounted support for a seat and adjusting means for moving the adjustable support. The adjustable support is preferably mounted immediately above the floor boards for reversible movement longitudinally of the body of the automobile. The major portion of the adjusting means is preferably mounted below the floor boards with a portion extending through an opening in the floor into engagement with the adjustable support. Means for manipulating adjusting means is preferably disposed immediately in front of the seat and so mounted that it does not project above the upper surface of the floor.

In the preferred form of the invention, the adjustable support is mounted in parallel guides disposed adjacent two opposite sides of the support. A downwardly facing rack is mounted on the adjustable support for movement therewith. The adjusting means comprises a worm rigidly mounted on a rotatable shaft beneath the floor and having a portion extending through an opening in the floor into engagement with the rack. The worm supporting shaft extends forwardly to a point in front of the seat, and its free end is provided with a ratchet mechanism which is so formed that it does not project above the upper surface of the floor when not in use.

The ratchet mechanism preferably comprises a ratchet wheel rigidly mounted on the worm supporting shaft. A casing surrounds the ratchet wheel. A reversible pawl and reversing means are also enclosed in the casing surrounding the ratchet wheel.

The invention will be better understood from a consideration of the following description in conjunction with the accompanying drawings in which:

Fig. 1 is an elevation, partly in section, of apparatus embodying the invention;

Fig. 2 is an elevation taken substantially along line 2—2 of Fig. 1;

Fig. 3 is a plan of the ratchet mechanism with the casing shown in section;

Fig. 4 is a section taken substantially along line 4—4 of Fig. 3;

Fig. 5 is a section taken substantially along line 5—5 of Fig. 3;

Fig. 6 is a fragmentary view of the ratchet casing;

Fig. 7 illustrates the operation of the ratchet mechanism; and

Fig. 8 is a view similar to that shown in Fig. 3, but showing the ratchet mechanism set for operation in the reverse direction.

The drawings show a supporting frame 10 having a seat 11 attached thereto. The frame 10 is mounted for sliding movement with two opposite side edges supported in parallel guides 12. The guides 12 are attached to the automobile floor boards 13. A downwardly facing rack 14 comprising a sheet metal plate having rack teeth pressed therein is rigidly attached to the frame 10 adjacent the floor boards 13. The longitudinal side edges of the rack plate 14 are bent upwardly and extend into grooves formed in a pressed sheet metal locking plate 15. The locking plate 15 is attached by means of bolts 16 extending through the floor boards to a housing 17 containing a worm 20. The worm 20 is rigidly mounted on a shaft 21 supported for rotation in suitable bearings in the end walls of the housing 17. Suitable thrust bearings are provided for engagement with the end face of the worm 20. The worm 20 extends through an opening in the floor into engagement with the rack plate 14. The shaft 21 extends to a point in front of the seat 11 and is supported adjacent its forward end by a bearing 22 comprising a suitably bent strap of sheet metal attached to the bottom surface of the floor. An operating lever 23 is attached to the forward end portion of the shaft 21, an opening being formed in the floor to permit access to the operating lever. The operating lever is so formed and mounted that its upper edge is flush with or slightly below the upper surface of the floor when not in use.

The operating lever 23 is a ratchet mechanism comprising a casing 24, a ratchet wheel 25 and a ratchet pawl 26. One end portion of the casing 24 is enlarged to provide sufficient space for the reception of the ratchet wheel and associated elements. The other end portion of the casing is relatively small and provides a handle. The casing 24 comprises two sheet metal plates 27 and 30. The plate 30 has its side edges bent at an angle of substantially 90° to the plane of the main surface to provide side walls. The side walls are provided with projecting tongues 31 which fit into grooves or slots formed in the side edge portions of the cover plate 27 to lock the plates 27 and 30 together. The ratchet wheel 25 is preferably locked in position on the shaft 21 by means of a pin 18. A spring 32 is provided for holding the ratchet pawl 26 in engagement with the teeth of the ratchet wheel 25. The ratchet pawl 26 is pivotally mounted between its ends on a pin 28 for reversible movement, and the reversing lever 33 is pivotally attached to the ratchet pawl 26 at one side of the pin 28. The reversing lever 33 is provided with an extension 34 which projects through an opening in the wall of the casing 24.

The teeth and the spaces between the teeth of the ratchet wheel 25 are preferably rectangular in outline. The ratchet pawl 26 is formed with projecting end portions having rectangular outer faces for engaging the teeth of the ratchet wheel and rounded inner faces which cause the pawl to ride over the teeth. The pawl 26 is provided with two surfaces, preferably curved, for engaging a curved end portion of the spring 32 in its two different operating positions. The spring 32 is locked in contact with two adjacent side walls of the casing 24 by two upstanding lugs 29 attached to the plate 30. The spring 32 extends between the lugs 29. The central portion of the spring 32 is bent to provide angular portions which lie in contact with the lugs 29 and lock the spring against bodily movement.

The ratchet pawl and reversing lever are connected by means of a modified ball and socket joint. A circular open-ended slot having an axis parallel with the axis of the pivot pin 28 is formed in the ratchet pawl. The reversing lever 33 has a cylindrical end portion which fits within the circular slot in the pawl and is held in place by means of the walls of the slot during reversing operations.

The ratchet mechanism may be easily manufactured and quickly assembled. The casing plates may be stamped from sheets of any desired type of sheet iron or other sheet metal. The movable parts, except the spring, may also be stamped from sheet metal.

One side edge portion of the enlarged end portion of the ratchet casing is straight, and the ratchet wheel and casing are of such sizes that when the worm shaft is mounted immediately adjacent the under surfaces of automobile floor boards of usual thickness, the ratchet mechanism may be mounted on the worm shaft with the straight edge of the casing lying flush with or slightly below the upper surfaces of the floor boards.

In the operation of the apparatus of the invention, the lever 33 may be manipulated to rotate the shaft 21 and the worm mounted thereon. As the worm 20 is rotated the rack 14 and the supporting frame and seat attached thereto are moved, the direction of the movement depending upon the direction of rotation of the shaft 21 and worm 20. The ratchet mechanism illustrated in the drawings permits reversible rotation of the shaft 21. Fig. 3 shows the pawl 26 so disposed that the shaft 21 may be rotated in one direction (to the left) and Fig. 8 shows the pawl so disposed that the shaft 21 may be rotated in the opposite direction (to the right). The position of the ratchet pawl may be altered by changing the position of the reversing lever 33 through the agency of the extension 34.

Fig. 7 shows the action of the pawl during the normal operating and return strokes for rotating the worm shaft in one direction. The position of the pawl during the downward stroke for rotating the worm shaft to the left is shown in dotted lines. The pawl riding over the teeth of the ratchet wheel is shown in full lines. The reversing lever is shown at its maximum distance from the ratchet wheel. To reverse the action of the ratchet mechanism the reversing lever is moved toward the ratchet wheel, causing the opposite end of the pawl to engage the ratchet wheel.

I claim:

1. In a device of the class described, an operating lever comprising a hollow casing, a ratchet wheel mounted within and completely enclosed by said casing and movable relatively thereto, a ratchet pawl pivotally mounted between its ends within said casing and completely enclosed thereby, and means slidable within the casing for selectively moving the opposite ends of said pawl into engagement with said ratchet wheel.

2. In a device of the class described, an operating lever comprising a hollow casing, a ratchet wheel mounted within and completely enclosed by said casing and movable relatively thereto, a ratchet pawl pivotally mounted between its ends within said casing and completely enclosed thereby, means slidable within the casing for selectively moving the opposite ends of said pawl into engagement with said ratchet wheel, and spring means within the casing engaging said pawl and tending to hold said pawl in engagement with said ratchet wheel.

In testimony whereof I affix my signature.

GERHARD FLINTERMANN.